June 23, 1931.  W. H. KEMPTON ET AL  1,811,469
METHOD OF MAKING COMPOSITE DISKS
Filed June 22, 1927

WITNESSES:

INVENTOR
Willard H. Kempton &
Thomas C. Roantree.
BY
ATTORNEY

Patented June 23, 1931

1,811,469

UNITED STATES PATENT OFFICE

WILLARD H. KEMPTON, OF WILKINSBURG, AND THOMAS C. ROANTREE, OF EAST PITTSBURGH, PENNSYLVANIA, ASSIGNORS TO WESTINGHOUSE ELECTRIC AND MANUFACTURING COMPANY, A CORPORATION OF PENNSYLVANIA

METHOD OF MAKING COMPOSITE DISKS

Application filed June 22, 1927. Serial No. 200,666.

Our invention relates to the manufacture of disks of composite laminated material and more particularly to methods of manufacturing gears having rims consisting of composite laminated material.

Hitherto, in the manufacture of composite gears consisting of metal hubs, the rims of laminated material and a heat hardened binder, it was the practice to make each disk or gear blank separately, machine the faces of the blank, stack a number of blanks, clamp them together on a mandrel and then cut gear teeth in the stack of blanks in one operation.

It was necessary to accurately machine the faces of the blanks before the gears were cut for the reason that inaccurate machining of the faces resulted in distortion of the gear blanks when the stacks were fastened on the mandrel preparatory to and during the gear-cutting operation. After the teeth were cut and the blanks were removed, the distorted blanks regained their former shape and caused the teeth to be distorted, thus causing misalignment and resulting in excessive wear.

Other disadvantages of the method of the prior art were that the machining, molding and cutting of separate blanks involved unnecessary operations and resulted in excessive manufacturing costs. Our method of manufacture eliminates the disadvantages of the prior-art methods and simplifies the manufacture of composite gears.

Therefore, one of the objects of our invention is to provide a method of manufacture of composite gears which shall result in a better and more perfect product at a decreased cost of manufacturing.

According to our invention, a gear blank of sufficient length to make a number of gears is provided. The teeth are cut on the surface of the gear blank in a single operation and the blank is then separated into gears of the desired thickness.

Figure 1:
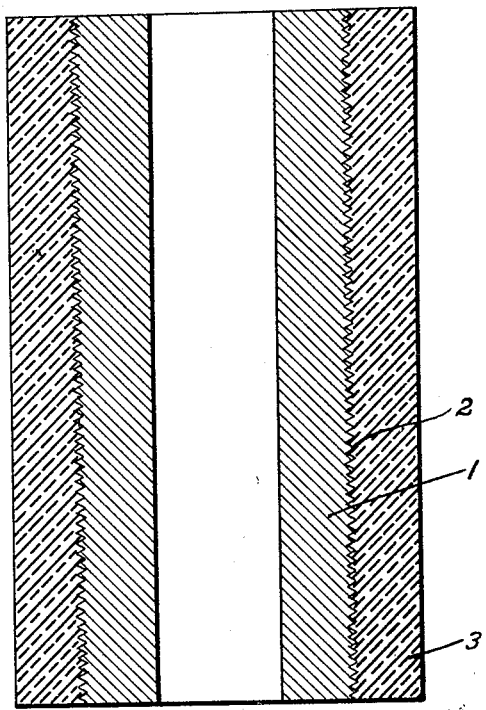
Figure 2:
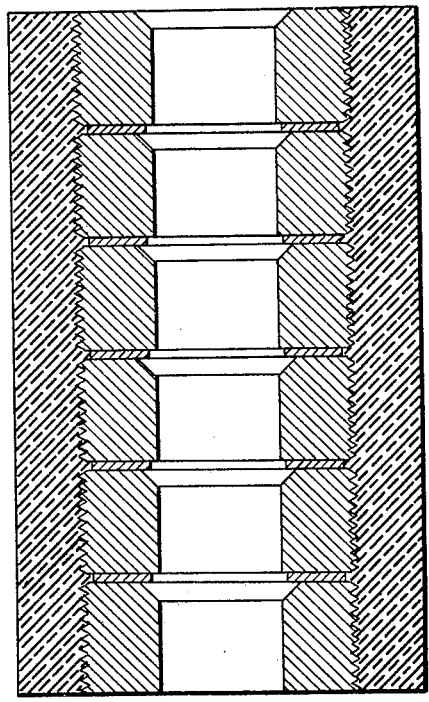

Our invention may be better understood by reference to the accompanying drawings in which Figure 1 is a cross sectional view of a gear blank made according to our method of manufacture, and Fig. 2 is a cross sectional view of a gear blank made according to an alternative method.

The gears resulting from our method of manufacture comprises a metal hub having a knurled, roughened or irregular outer surface that engages and supports a rim of composite laminated material. The rim may be made of cloth, wood fiber, or other composite moldable material that is treated and then molded with a phenolic condensation product or other suitable binding material.

It will be readily understood that the rim may be built up in numerous ways, for example, we may provide segments of treated cloth simulating sectors of a hollow circle the inside radius of which is of the proper dimension to accommodate the hub. The segments are placed about the hub and the molding process performed. According to another manner of construction we may provide treated cloth tape having diamond-shaped notches in its middle portion, folded in the middle and then wound helically on the hub. In still another manner of construction, we may provide small pieces of treated paper, cloth or other like moldable compositions properly distributed in the mold to provide the requisite density of the rim when the gear is molded. The rim may be molded on the hub directly from the moldable material or the moldable material may be pre-formed and then pressed on the hub.

In making the blank shown in Fig. 1, a steel tube or hub 1, having a center bore of the diameter desired in the finished gear, is provided. The surface 2 of the tube may be machined with grooves or with any suitable irregular surface, but it is preferably knurled in order to provide a strong mechanical joint between the tube and the rim portion 3. The tube is clamped in a mold by means of a bolt or mandrel having an elongated head of the same diameter as the outside diameter of the tube.

In a preferred construction, cloth, treated with a phenolic condensation product and having diamond shaped notches in its center, is folded in the center and wound helically about the tube and the elongated head of the mandrel. The helical winding is then pressed into place on the tube and molded with heat and pressure, in the manner well known in the art. See patent to Bierman et al, No. 1,599,550, issued on September 14, 1922.

After the molding is completed, the gear blank is removed, mounted in a gear-cutting machine and tightly clamped, and gear teeth are cut in the surface of the laminated molded material.

The gear blank is then removed from the gear-cutting machine and placed in a milling machine. The gear blank is slowly revolved, and the blank is cut transversely into disks of the thickness desired in the finished gear. If desired, the cutting operation may be performed in a lathe, in a manner well known to the art. After a few minor finishing operations, such as cutting chamfers and eliminating rough edges, the gear is complete and ready for use.

A gear blank of slightly modified structure is shown in Fig. 2. A plurality of hubs are prepared in the desired form, as, for example, by providing them with roughened outer surfaces and chamfered inner edges. The hubs are assembled to form a tubular structure having a spacer between adjacent hubs, and the tubular structure is accurately and securely bolted in the mold. The composite material is next molded on the hub to form a tube and, after cutting the gear teeth, the molded material is cut transversely to the axis of the tube at the spacers.

The latter method of manufacturing gears is preferable in many gear-making operations since it avoids cutting the steel tube, but, in both methods, the gear blank is correctly aligned and is not subjected to distorting strains during the tooth-cutting operation. Therefore, a more accurate and mechanically exact gear results from the use of our invention. Both methods eliminate the time consumed in accurately machining the several faces of the gears and in separately handling and molding the separate gears.

Although we have described certain methods of manufacturing gears and have named certain preferred materials and structures, it is apparent that modifications of our invention may be made without departing from its spirit and scope, as defined in the appended claims.

We claim as our invention:

1. The method of manufacturing composite disks consisting of metal hubs and rims of laminated material comprising providing a plurality of hub portions, molding a single rim portion about the said hub portions and cutting the blank so formed transversely to form disks.

2. The method of manufacturing composite gears consisting of metal hubs and rims of laminated material comprising providing a metal hub portion, molding the rim portion of composite laminated material about the hub, cutting gear teeth on the outer surface of said rim portion and cutting the blank so formed transversely to form gears.

3. The method of manufacturing composite gears consisting of a plurality of hub portions and a rim of laminated material comprising providing a plurality of hub portions, molding the rim portion of composite laminated material about the hub, cutting gear teeth on the outer surface of said rim portion, and cutting the blank so formed transversely to form disks.

4. A method of manufacturing a composite gear consisting of a hub portion and a rim portion comprising mounting a stack of hubs on a suitable mandrel, spacing apart the hubs, molding an outside layer of composite laminated material about the stack of hubs, cutting gear teeth in the surface of the laminated material and cutting apart the laminated material at the junction of the hubs to form gears.

In testimony whereof, we have hereunto subscribed our names this 16th day of June, 1927.

WILLARD H. KEMPTON.
THOMAS C. ROANTREE.